(12) United States Patent
Bechtel et al.

(10) Patent No.: US 10,539,289 B2
(45) Date of Patent: Jan. 21, 2020

(54) LASER LIGHTING MODULE WITH SAFETY FUNCTION

(71) Applicant: Lumileds Holding B.V., Schiphol (NL)

(72) Inventors: Hans Helmut Bechtel, Roetgen (DE); Thomas Diederich, Stolberg (DE)

(73) Assignee: LUMILEDS HOLDING B.V., Schiphol (NL)

( * ) Notice: Subject to any disclaimer, the term of this patent is extended or adjusted under 35 U.S.C. 154(b) by 0 days.

(21) Appl. No.: 16/389,431

(22) Filed: Apr. 19, 2019

(65) Prior Publication Data

US 2019/0323677 A1    Oct. 24, 2019

(30) Foreign Application Priority Data

Apr. 19, 2018    (EP) ..................................... 18168216

(51) Int. Cl.
*F21S 41/16*    (2018.01)
*F21S 45/70*    (2018.01)
*F21S 41/675*    (2018.01)
*F21S 41/176*    (2018.01)

(52) U.S. Cl.
CPC ............... *F21S 45/70* (2018.01); *F21S 41/16* (2018.01); *F21S 41/176* (2018.01); *F21S 41/675* (2018.01)

(58) Field of Classification Search
CPC .................................. F21S 41/16; F21S 45/70
See application file for complete search history.

(56) References Cited

U.S. PATENT DOCUMENTS 10,108,079 B2 * 10/2018 Raring ................ H01S 5/34333

FOREIGN PATENT DOCUMENTS

| DE | 102014214601 A1 | 1/2016 |
| DE | 102016207759 A1 | 11/2017 |
| WO | 2016156000 A2 | 10/2016 |

* cited by examiner

*Primary Examiner* — Robert J May
(74) *Attorney, Agent, or Firm* — Volpe and Koenig, P.C.

(57) ABSTRACT

A laser lighting module for a vehicle headlight includes at least one laser, a scanning arrangement, a light conversion device, a safety mirror, a safety detector and a safety controller. The laser emits light in a first wavelength range and the scanning arrangement moves a beam of the light within a scanning solid angle so a spot of the light moves across the light conversion device. The light conversion device converts a fraction of the light to converted light in a different wavelength range than the first and emits a mixture of transmitted and converted light. The safety mirror is arranged within the scanning solid angle such that at least 90% of the transmitted light hits the safety mirror. The safety controller receives the control signal, generated by the safety detector from the safety detection light, and switches off the laser if the control signal exceeds a first threshold value.

15 Claims, 7 Drawing Sheets

LASER LIGHTING MODULE WITH SAFETY FUNCTION

FIELD OF INVENTION

The invention relates to a laser lighting module for a vehicle headlight with a safety function. The invention further relates to a vehicle headlight comprising the laser lighting module.

BACKGROUND

WO 2016/156000 A2 discloses a method for operating a laser activated light source and a corresponding light converter. The light converter comprises a light converting layer with a sensor functionally integrated with the light converting layer. The sensor comprises a pattern of conductive layers being arranged in the emission path of light generated by means of the light converter. A laser radiation is adjusted in accordance with a detection of a condition of the light converting layer by measurement of the sensor.

The safety functionality of the sensor does not cover all failure modes and reduces efficiency of the laser activated light source.

DE102014214601A1 and DE102016207759A1 describe safety mechanisms for static laser beams where one or more sensors receive a small part of the laser light having passed the light converter. DE102014214601A1 and embodiments of DE102016207759A1 use a polarized laser source and use the fact that the light converter will destroy such polarization. I.e., by the sensor only being sensitive for laser light of original polarization, such sensor signal can detect sufficiently large defects of the light converter. Alternatively or in addition, DE102016207759A1 foresees a sensor array whose signals are compared to each other, so contributing spatial resolution of which location of the light converter the laser light stems from.

SUMMARY

It is an object of the present invention to provide a laser lighting module for a scanning laser beam of simple construction and with improved efficiency and laser safety.

According to a first aspect a laser lighting module for a vehicle headlight is provided. The laser lighting module comprises at least one laser, a scanning arrangement, a light conversion device, a safety mirror, a safety detector, and a safety controller. The at least one laser is arranged to emit laser light characterized by a first wavelength range. The scanning arrangement is arranged to move a laser beam of the laser light within a scanning solid angle such that a laser spot of the laser light is moved across a light entrance surface of the light conversion device. The light conversion device comprises a light converter. The light converter is arranged to convert a fraction of the laser light to converted light. The light converter may be further arranged to scatter the laser light. The converted light is characterized by a second wavelength range different than the first wavelength range. The light conversion device comprises a light emission surface arranged to emit a mixture of transmitted laser light and converted light. The safety mirror is arranged within the scanning solid angle such that at least 90%, preferably at least 98%, more preferably at least 99% of the transmitted laser light emitted within the scanning solid angle hits the safety mirror. The safety mirror is arranged to provide safety detection light by reflecting a fraction of the transmitted laser light hitting the safety mirror to the safety detector. The safety detector is arranged to generate, irrespective of any polarization of the safety detection light (16), at least one control signal upon detection of the safety detection light. The safety controller is arranged to receive the at least one control signal from the safety detector. The safety controller is arranged to switch off the at least one laser if the at least one control signal exceeds a first threshold value.

The scanning solid angle is the solid angle in which laser light would be emitted by means of the scanning arrangement without the light conversion device. The safety mirror is arranged within the scanning solid angle such that any damage, local or global, of the light converter or the light conversion device which is hit by the scanning laser beam during operation of the laser lighting module can be detected. A local damage may, for example, cause a short peak in the intensity of the transmitted laser light when the laser spot hits the local damage during scanning as conversion and/or scattering of the laser light is reduced or completely absent due to the damage. This intensity peak causes a corresponding intensity peak in the detection light. The safety detector detects this intensity peak of the safety detection light such that the control signal raises above the first threshold. A detection time (time constant) for determining the control signal has, for example, to be adapted to the laser power, scanning velocity and the like to enable a reliable detection of the damage of the light conversion device and the corresponding leaking laser light which may cause eye damage of other traffic participants. The reflectivity of the safety mirror in the first wavelength range must be sufficiently high to enable a reliable detection of the damage but should be as low as possible to avoid unnecessary light losses. The reflectivity in the first wavelength range may, for example, be less than 50% such that less than 50% of the transmitted laser light within the scanning solid angle of the laser light hitting the safety mirror is being reflected while all laser light under different solid angles passes the safety mirror. The reflectivity in the first wavelength range may more preferably be less than 30%, and most preferably be less than 10%. The safety mirror is preferably arranged such that more than 95% or, more preferably, more than 98% the transmitted laser light in the scanning solid angle hits the safety mirror. The safety mirror may most preferably cover a solid angle which comprises the scanning solid angle such that transmitted laser light hitting the safety mirror in a rim around the scanning solid angle may be reflected to the safety detector. The laser lighting module is arranged such that high-power laser light which is not transformed, i.e., is neither converted nor scattered, by the light converter causes switching off of the laser by detecting an intensity peak or increase of the safety detection light by means of the safety mirror, safety detector, and safety controller.

The safety mirror enables monitoring of essentially all transmitted laser light which may be relevant with respect to eye safety of traffic participants. The pattern of conductive layers described by WO 2016/156000 A2 has in this respect the disadvantage that resolution of failure detection competes with efficiency of the laser activated light source. The conductive layers arranged in the light emission path of the light converter cause a substantial optical absorption. It is therefore necessary to find a compromise between the area covered by the conductive layers and the total efficiency of the laser activated light source.

The safety detector detects the safety detection light irrespective of any polarization of the safety detection light. This allows for a very simply construction of the safety detector rendering in particular any polarization filters unnecessary. As well, the at least one laser does not need to emit polarized laser light (but might do so), thus allowing for a broader range of lasers being useful.

The scanning arrangement may, for example, comprise a static laser and a movable reflective device (e.g. MEMS mirror) or a movable laser to emit the laser light in the scanning solid angle. The scanning solid angle may be determined with respect to the centre of movement of the movable reflective device or the movable laser.

The first wavelength range may be characterized by a first median wavelength. The second wavelength range of the converted light may be characterized by a second median wavelength which is usually longer than the first median wavelength. The light converter may comprise a light converting material like a yellow garnet phosphor YAG:Ce (e.g. $Y_{(3-0.4)}Gd_{0.4}Al_5O_{12}$:Ce) which is arranged to convert, for example, blue (laser) light to yellow converted light. A mixture of blue (laser) light and yellow converted light may be used to provide white light in a vehicle headlight.

The safety mirror may be arranged between the light conversion device and an optical module. The optical module is arranged to transform the transmitted laser light and the converted light for projecting the transmitted laser light and the converted light to an image plane. The optical module may comprise one or more optical elements which may be arranged to support projection of the transmitted laser light and the converted light by means of a vehicle headlight to the image plane. The projection of the light may be further supported by means of one or more additional optical elements comprised by the vehicle headlight. The image plane of the vehicle headlight is usually arranged at a distance of 25 m.

The safety mirror may, for example, be comprised by a transparent plate which is arranged under an angle smaller than 90° to a surface normal of the light conversion device or light converter. The size of the transparent plate may preferably be chosen to fully cover the scanning solid angle taking into account the angle of the transparent plate with respect to the surface normal of the light converter. The surfaces of the transparent plate may be arranged to reflect only a small portion (e.g. less than 1%) of light in the first wavelength range (e.g. blue laser light) received within the scanning solid angle under a solid angle smaller than 10° with respect to an emission direction of directly transmitted laser light, i.e., of laser light being transmitted without having being scattered. The surfaces of the transparent plate may, for example, comprise a multilayer coating of a series of layers of alternating high and low refractive index, i.e., a dichroic mirror, to provide the appropriate reflectivity.

The light converter may alternatively be attached to a transparent element. The safety mirror may be comprised by the transparent element. Integrating the safety mirror in the transparent element attached to the light converter may enable a compact design of the safety mirror and the corresponding safety detector. The safety mirror may, for example, comprise at least a part of a surface or interface of the transparent element. The part of the surface may, for example, be comprised by an optical element, e.g. a lens, of the optical module. Reusing a surface or surfaces element of the optical element may enable a highly integrated laser lighting module.

The laser lighting module may comprise an optical concentrator. The optical concentrator is arranged to redirect the safety detection light to the safety detector. The optical concentrator may reduce the size of the safety detector which is needed to monitor the safety detection light. The optical concentrator may, for example, comprise a lens for focusing the safety detection light or a reflective arrangement to concentrate the safety detection light to the safety detector.

The safety detector described in the embodiments above may comprise an array of detector elements (e.g. array of photo diodes, CCD, and the like). The safety controller is in this case arranged to receive a plurality of control signals from the detector elements. The safety controller may in this embodiment be arranged to switch off the lighting module if one of the control signals exceeds the first threshold. The first threshold may be the same for all control signals provided by the detector elements or may be adapted to the position of the detector element within the safety detector. An array of detector elements may have the advantage that a very sensitive and high-resolution monitoring of the safety detection light may be enabled.

The safety detector may alternatively comprise one detector element. The safety mirror or an optical concentrator may be arranged to concentrate the safety detection light to the detector element to reduce the size of the detector element. One detector element or only a few detector elements (e.g. two, three or four) may enable a simple and cost-effective safety detector.

The safety controller of any embodiment described above may be arranged to switch off the at least one laser if the control signal falls below a second threshold value. The second threshold value corresponds to the control signal generated by a minimum of safety detection light received by the safety detector. Operation of the laser is only continued if there is a minimum control signal. The safety mirror can therefore not simply be taken out of the emission path of the converted laser light and the transmitted laser light. Furthermore, covering of the safety detector would make the laser inoperable. The control signal or the control signals must be between the second threshold value and the first threshold value to enable operation of the laser lighting module. Switching off the laser based on the second threshold value may be adapted to the driving scheme of the laser if the driving scheme comprises periods in which the laser is switched off. There may be a feedback loop between the laser and/or an electrical (laser) driver to only activate detection of the safety detection light in time periods in which the at least one laser emits laser light.

The safety mirror may comprise an antireflective coating in the second wavelength range for reducing reflection of converted light to the safety detector. The antireflective coating may, for example, be a broadband antireflective coating suppressing reflection of the converted light for a broad range of incident angles to reduce optical losses caused by the safety mirror. Each surface of the safety mirror interacting with the converted light may comprise such an antireflective coating.

The safety mirror may further comprise a reflective coating which is reflective in at least a part of the first wavelength range to provide the safety detection light. The reflectivity of the reflective coating is adapted to the laser power and sensitivity of the safety detector to enable an eye safe and efficient laser lighting module. Each surface of the safety mirror interacting with the converted light may comprise such a reflective coating. The reflective coating may be arranged to reflect light in the first wavelength range at an angle within a cone of 10° with respect to a direction of laser light provided by the scanning arrangement. The reflective coating is in this embodiment arranged to reflect laser light or redirected laser light which does not interact with the light converter. The laser light which is not converted or scattered by the light converter is emitted by means of the scanning arrangement in a defined direction within the scanning solid angle. Light in the first wavelength range which hits the safety mirror at an angle outside the cone of 10° has been scattered by the light converter. The reflective coating may thus be optimized to avoid unnecessary reflection of (most of the) scattered laser light but detect damage or removal of the light converter by only monitoring the laser light or redirected laser light impinging on the safety mirror in this defined cone of angles.

The safety mirror may further comprise a (e.g. local) release structure with, for example, increased reflectivity in the first wavelength range. The scanning arrangement may be arranged to direct the laser beam to the release structure, for example, at the beginning of laser emission to release laser emission. Laser emission is stopped if no corresponding release signal is determined by means of the safety detection light. A higher reflectivity in the first wavelength range may simplify detection of the release signal. The release signal may enable or support detection of a removed/ defect safety mirror, a removed/defect safety detector or a defect scanning arrangement. The scanning arrangement may additionally be arranged to direct the laser beam to the release structure in predefined time periods.

The safety detector may alternatively or in addition be arranged to reduce detection of converted light. Suppressing detection of light outside the first wavelength range may increase sensitivity of the safety detector. The safety detector may, for example, comprise an optical filter which is transmissive in the first wavelength range and reduces transmission of light in the second wavelength range. The optical filter is preferably arranged such that only light in the first wavelength range is transmitted.

According to another aspect a vehicle headlight is provided. The vehicle headlight may comprise at least one laser lighting module as described above. The vehicle headlight may further comprise an electrical interface. The electrical interface is arranged to transfer electrical signals to the at least one laser and optionally to the safety controller. The electrical signals may comprise a drive current for driving the at least one laser or control signals to control light emission of the at least one laser. The vehicle headlight may further comprise an electrical driver for electrically driving the at least one laser. The electrical driver may be controlled by means of external control signals provided via the electrical interface or by means of internal control signals provided, for example, by the safety controller.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings:

FIG. 1 shows a first embodiment of an inventive laser lighting module

FIG. 2 shows transmission characteristics of a safety mirror

FIG. 3 shows a control signal provided by a safety detector

FIG. 4 shows a second embodiment of an inventive laser lighting module

FIG. 5 shows a third embodiment of an inventive laser lighting module

FIG. 6 shows a fourth embodiment of an inventive laser lighting module

FIG. 7 shows a fifth embodiment of an inventive laser lighting module

In the Figures, like numbers refer to like objects throughout. Objects in the Figures are not necessarily drawn to scale.

DETAILED DESCRIPTION OF THE PREFERRED EMBODIMENTS

Various embodiments of the invention will now be described by means of the Figures.

Figure 1:
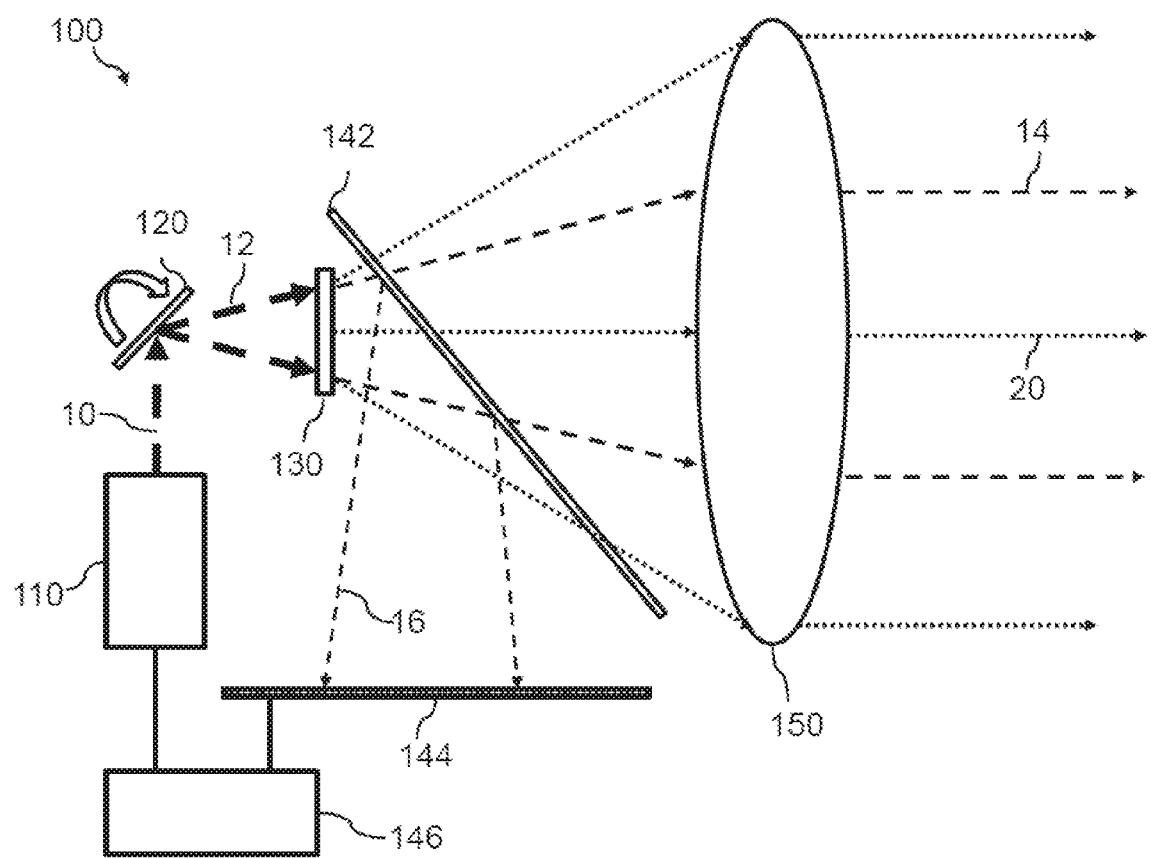

FIG. 1 shows a first embodiment of a laser lighting module 100. The laser lighting module 100 comprises a laser 110 and a light redirection device 120. The light redirection device 120 is a movable mirror (e.g. MEMS mirror) which is arranged to redirect laser light 10 emitted by the laser 110 within a scanning solid angle to a light entrance surface of a light conversion device 130. The light conversion device 130 comprises a light converter (e.g. a ceramic phosphor platelet) which converts a fraction of the laser light 10 to converted light 20. Redirected laser light 12 is scanned across the light converter according to a predefined pattern. The laser light 10 may, for example, be blue light (first wavelength range). Around 70% of the blue laser light 10 may be converted to yellow converted light 20. A mixture of transmitted laser light 14 and converted light 20 leaves a light emission surface of the light conversion device 130. Most or all of the transmitted laser light 14 is usually scattered within the light converter such that the solid angle in which the transmitted laser light 14 is emitted is bigger than the scanning solid angle of the redirected laser light 12. The transmitted laser light 14 scattered by the light converter of the light conversion device may, for example, be characterized by a Lambertian intensity distribution.

A safety mirror 142 is arranged between the light conversion device 130 and an optical module 150. The safety mirror 142 comprises a transparent plate, placed under an angle smaller than 90° to a surface normal of the light emission surface of the light conversion device 130. At least one of the surfaces of the transparent plate is coated to reflect a small portion of the transmitted laser light 14 to provide safety detection light 16. In normal operation, the intensity of blue light reflected by the transparent plate is low because of conversion and scattering of almost all laser light. The emitted white light power (mixture of transmitted laser light 14 and converted light 20) may, for example, comprise 30% of transmitted laser light 14. Therefore, only 0.3 times 0.03 (fraction of light in a 10° solid angle of a Lambertian distribution)=0.85% of the blue laser light 10 emitted by the laser 110 is hitting the transparent plate in a cone of 10° around the direction pointing to the origin of the scanning solid angle. Making the plate reflective only to the redirected laser light 12 and only within such cone, and choosing a reflectance of the transparent plate well below 100%, e.g. as 20%, the light loss by means of safety detection light 16 is negligible.

The situation changes drastically in case of a damage, local or global, of the light converter, e.g. a phosphor platelet. Redirected laser light 12 now may pass the damage, in the worst case, without any scattering and absorption by means of the light converter. Therefore, 100% of the redirected laser light 12, instead of the 0.85% in the case of an intact light converter, is hitting the transparent plate in the cone where the plate is reflective to the redirected laser light 12. The peak intensity of the safety detection light 16 will be in this case, for a small moment in time (see FIG. 3), orders of magnitudes higher in comparison to the intact light converter.

The transparent plate therefore covers the full scanning solid angle and, in this embodiment with a more extended transparent plate as shown in the figure, even the bigger solid angle which is defined by the aperture of the optical element (focusing lens) of the optical module 150 to guarantee that each safety critical damage of the light converter can be detected. The safety detection light 16 reflected by the safety mirror 142 is detected by means of a safety detector 144 which comprises in this case an array of detector elements (e.g. an array of photo detectors). The detector elements submit a multitude of control signals to a safety controller 146. The safety controller 146 switches off the laser 110 as soon as at least one control signal exceeds a first threshold value (see FIG. 3) for a defined time period. The safety controller 146 may be further arranged to switch off the laser 110 if one or more of the control signals indicate that the safety mirror 142 was removed out of the emission path of the transmitted laser light 14.

Figure 2:
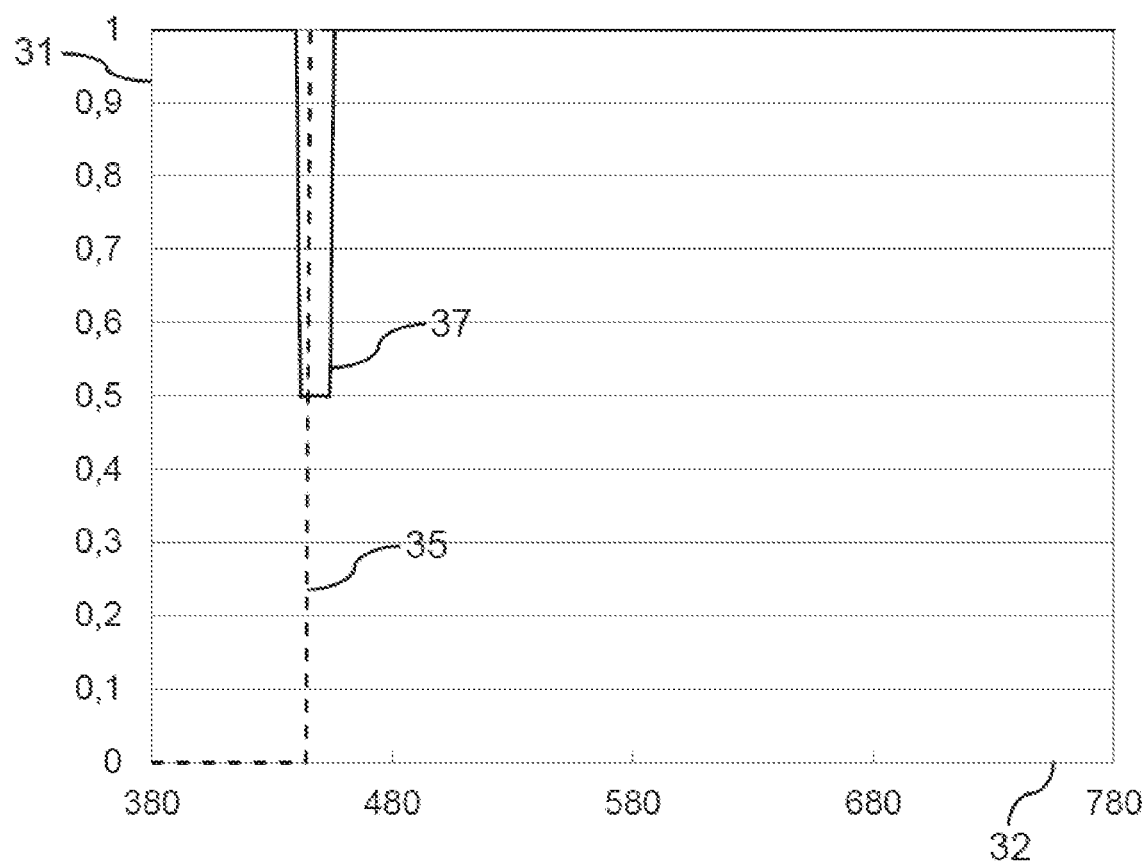

One surface of the transparent plate as discussed with respect to FIG. 1 may be covered with a broadband antireflection filter, or a long wave pass filter (LWP) with a transmission edge at a wavelength shorter than the peak emission wavelength of the laser light 10. The filter properties of the respective surface may be adapted by deposition of alternating layers with high and low refractive index. The other surface of the transparent plate (preferably the surface facing the light conversion device 130) may be covered with a LWP with a transition edge at close to the peak emission wavelength of the laser light 10 of around 430 nm shown in FIG. 2. The transmission characteristic of the optical transmission 31 as a function of the wavelength 32 (in nm) is shown by curve 35 in FIG. 2. Alternatively, the dichroic filter on the surface is realized as a notch filter with a sharp decrease in transmission of 5% to 50% in a wavelength range of 10 nm around the peak emission wavelength of the laser light 10 as shown by curve 37 in FIG. 2. The filter curves of the safety mirror 142 may be selected in combination with the angle of the safety mirror 142 (especially in case of a transparent plate as discussed above) to the light emission surface of the light conversion device 130 to reflect only transmitted laser light 14 hitting the safety mirror 142 in a cone of a few degrees with respect to the propagation direction of the laser light hitting the light conversion device 130. If the incidence angle of transmitted laser light 14 changes (e.g. because of scattering within the light converter of the light conversion device 130), the transmission curves of the filters shift to shorter wavelengths, and redirected laser light 12 is no longer reflected. Optical losses may therefore be small in normal operation of the laser lighting module 100.

Figure 3:
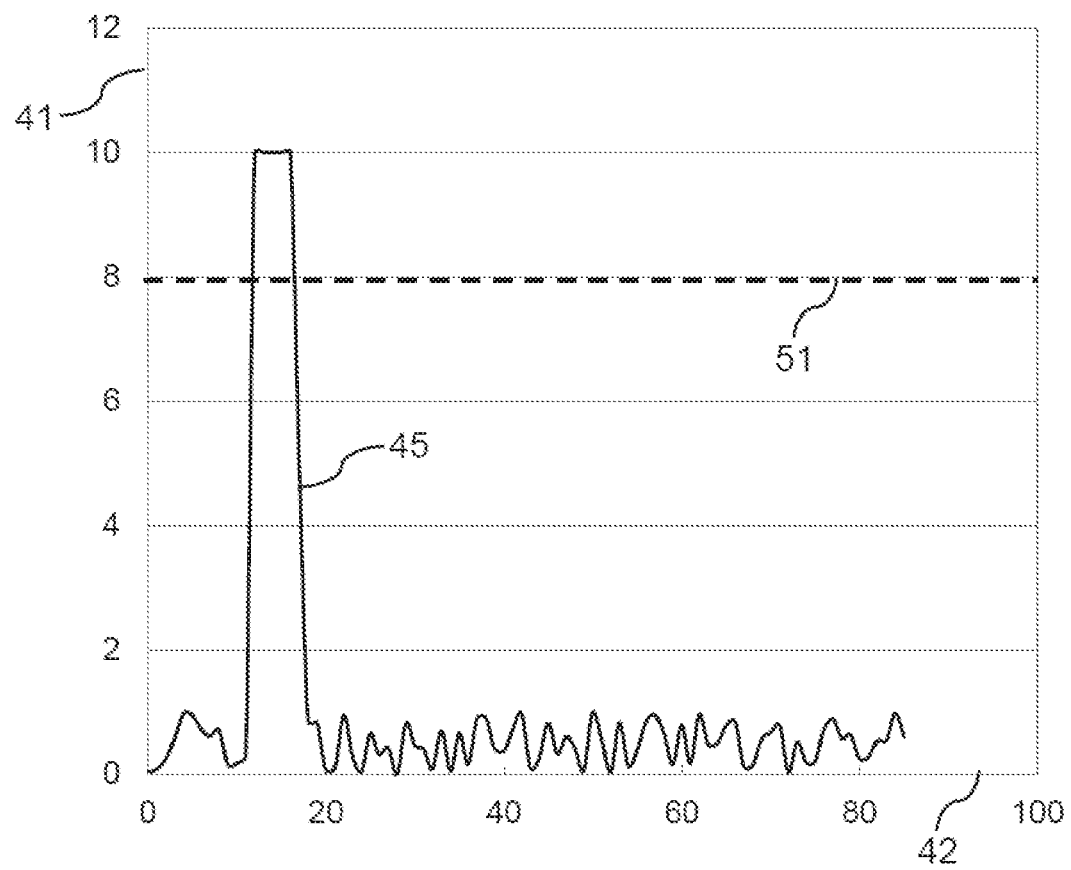

FIG. 3 shows a control signal 45 provided by the safety detector 144. The control signal 45 may, for example, be a control signal 45 as a function of time 42 (in µs) received by the safety controller 146 from one detector element of the safety detector 144 discussed with respect to FIG. 1. The signal strength 41 of the control signal 45 raises for a short period of 10 µs above a first threshold value 51. The signal peak or a combination of the peak height and the width of the control signal 45 indicates that there may be a local damage of the light converter which is critical with respect to eye safety of the laser lighting module 100. The safety controller 146 therefore switches off the laser 110 if the control signal exceeds the first threshold value 51 for a defined time period.

Figure 4:
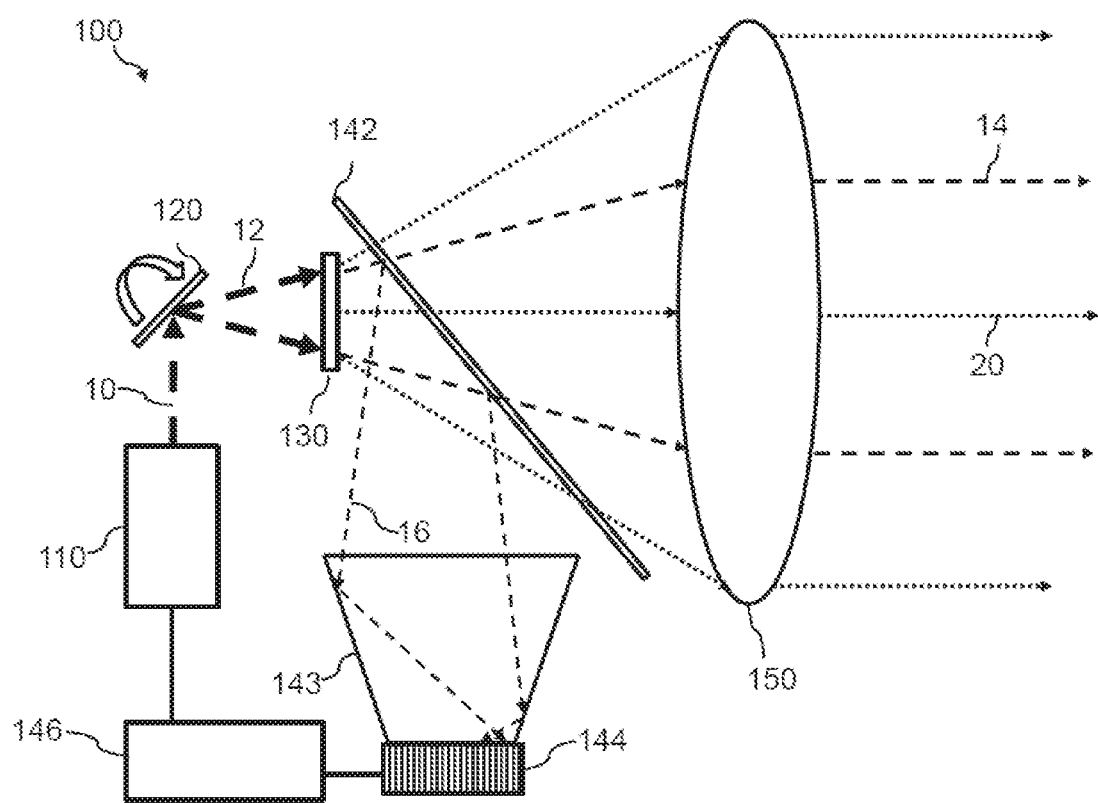

FIG. 4 shows a second embodiment of the laser lighting module 100. The general configuration of the laser lighting module 100 is very similar as discussed with respect to FIG. 1. The laser lighting module 100 comprises in this embodiment an optical concentrator 143 which is arranged to concentrate the safety detection light 16 to the safety detector 144. The optical concentrator 143 comprises reflector surfaces redirecting the safety detection light 16 to the safety detector 144. The safety detector 144 comprises in this embodiment one photo detector.

Figure 5:
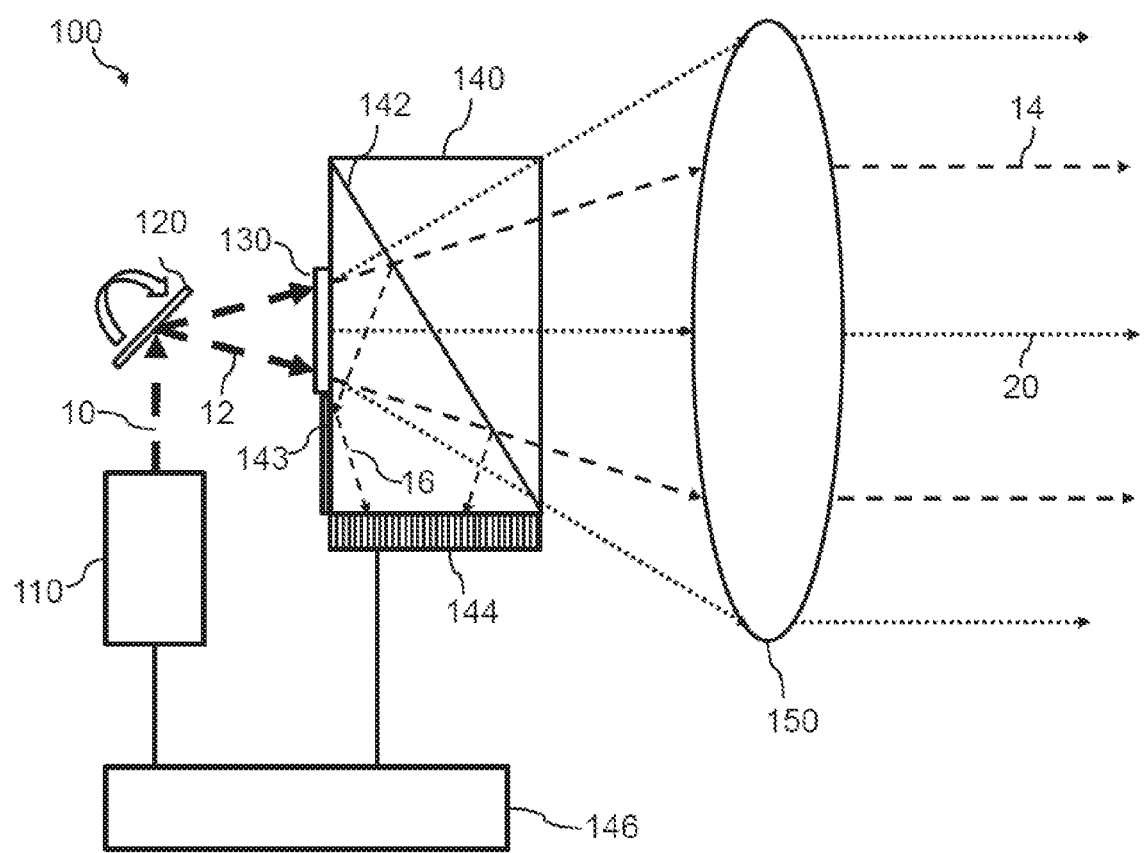

FIG. 5 shows a third embodiment of the laser lighting module 100. The safety mirror 142 is in this embodiment integrated in a transparent block 140. The safety mirror 142 is provided on an interface arranged within the transparent block which is inclined with respect to the surface normal of the light emission surface of the light conversion device 130. The light conversion device 130 comprises a phosphor platelet which is attached to a surface of the transparent block 140. Safety detection light 16 reflected by the safety mirror 142 is reflected to a safety detector 144 attached to another surface of the transparent block 140. An optical concentrator 143 is attached below the light conversion device 130 to redirect the safety detection light 16 to the safety detector 144. The transparent block 140 may enable a compact design of the safety mirror 142 and the safety detector 144.

Figure 6:
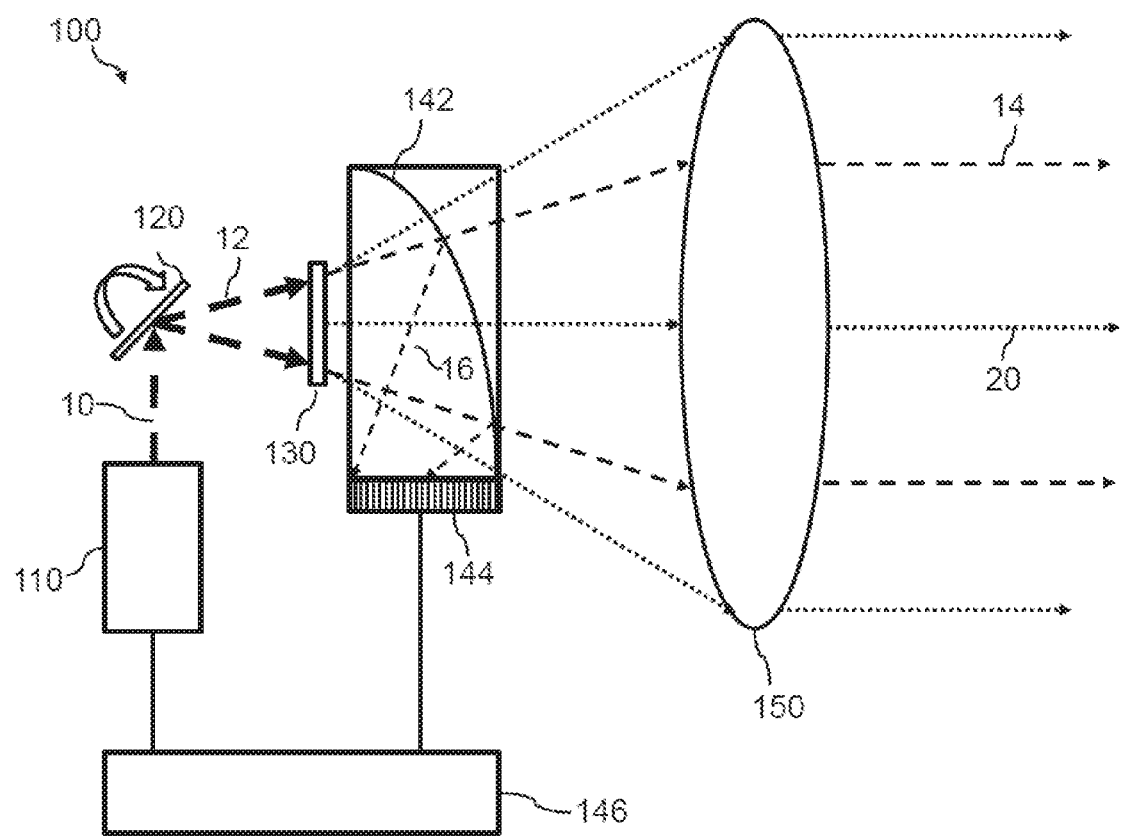

FIG. 6 shows a fourth embodiment of the laser lighting module 100. The safety mirror 142 is again integrated in a transparent block 140 in a similar way as discussed with respect to FIG. 5. The safety mirror 142 is in this embodiment curved to focus the safety detection light 16 to the safety detector 144. The light conversion device 130 is in this embodiment not attached to the transparent block 140.

Figure 7:
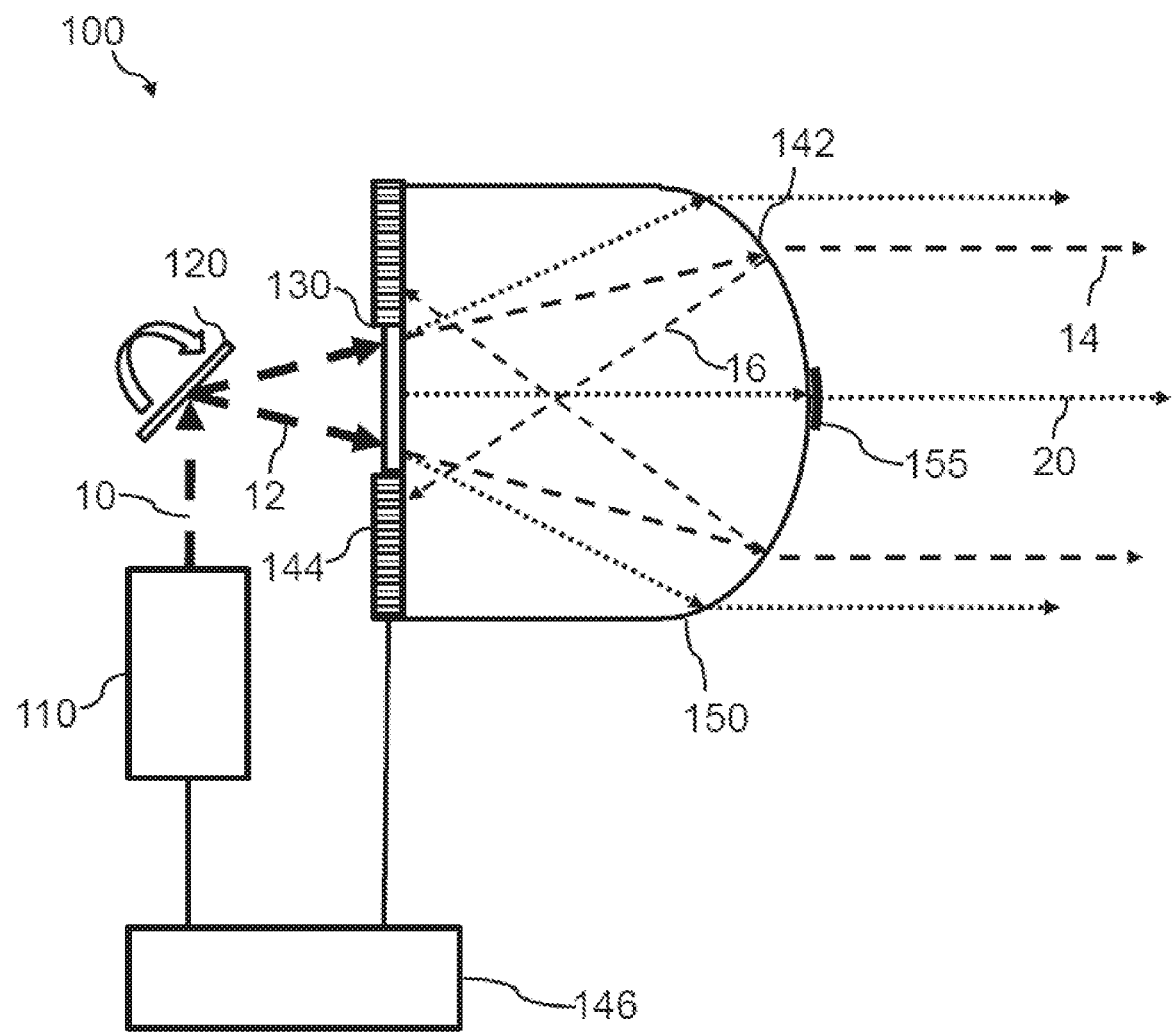

FIG. 7 shows a fifth embodiment of the laser lighting module 100. The safety mirror 142 is in this embodiment integrated in the optical module 150. The optical module 150 comprises a plano-convex lens, wherein a flat surface of the lens is attached to a phosphor platelet comprised by the light conversion device 130. The remainder of the flat surface of the lens surrounding the phosphor platelet is covered by a safety detector 144. The curved surface of the lens comprises the safety mirror 142 to provide safety detection light 16. The curved surface may, for example, comprise a reflective coating reflecting a fraction of the transmitted laser light 14. The laser lighting module 100 further comprises an optical protector 155 which is arranged along the optical axis of the lens. The optical protector 155 avoids that, for example, a small hole in the centre of the phosphor platelet may cause a dangerous beam of transmitted laser light. The optical protector 155 may, for example, comprise a reflector covering a small solid angle. The optical protector 155 may alternatively be arranged to redirect a fraction of the transmitted laser light to the safety detector 144 (e.g. by means of backscattering a fraction of the transmitted laser light 14). The size of the optical protector 155 is usually rather small because the phosphor platelet is small in comparison to the lens.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

REFERENCE SIGNS 10 laser light
12 redirected laser light
14 transmitted laser light
16 safety detection light
20 converted light
31 optical transmission
32 wavelength [nm]
35 transmission of long wavelength path filter
37 transmission of notch filter
41 signal strength
42 time [μs]
45 control signal
51 first threshold value
100 laser lighting module
110 laser
120 scanning arrangement
130 light conversion device
140 transparent block
142 safety mirror
143 optical concentrator
144 safety detector
146 safety controller
150 optical module
155 optical protector

What is claimed is:

1. A laser lighting module for a vehicle headlight comprising:
   at least one laser;
   a scanning arrangement;
   a light conversion device;
   a safety mirror;
   a safety detector; and
   a safety controller;
   wherein the at least one laser is arranged to emit laser light characterized by a first wavelength range,
   wherein the scanning arrangement is arranged to move a laser beam of the laser light within a scanning solid angle such that a laser spot of the laser light is moved across a light entrance surface of the light conversion device,
   wherein the light conversion device comprises a light converter,
   wherein the light converter is arranged to convert a fraction of the laser light to converted light, wherein the converted light is characterized by a second wavelength range different than the first wavelength range,
   wherein the light conversion device comprises a light emission surface arranged to emit a mixture of transmitted laser light and converted light,
   wherein the safety mirror is arranged within the scanning solid angle such that at least 90% of the transmitted laser light emitted within the scanning solid angle hits the safety mirror,
   wherein the safety mirror is arranged to provide safety detection light by reflecting a fraction of the transmitted laser light hitting the safety mirror to the safety detector, wherein the safety detector arranged to generate, irrespective of any polarization of the safety detection light, at least one control signal upon detection of the safety detection light, wherein the safety controller is arranged to receive the at least one control signal from the safety detector, and
   wherein the safety controller is arranged to switch off the at least one laser if the at least one control signal exceeds a first threshold value.

2. The laser lighting module according to claim 1, wherein the safety mirror is arranged between the light conversion device and an optical module, and
   wherein the optical module is arranged to transform the transmitted laser light and the converted light for projecting the transmitted laser light and the converted light to an image plane.

3. The laser lighting module according to claim 1, wherein the light converter is attached to a transparent element, and wherein the safety mirror is comprised by the transparent element.

4. The laser lighting module according to claim 3, wherein the safety mirror comprises at least a part of a surface or interface of the transparent element.

5. The laser lighting module according to claim 4, the laser lighting module further comprising an optical module for transforming the transmitted laser light and the converted light for projecting the transmitted laser light and the converted light to an image plane, and wherein the part of the surface is comprised by an optical element of the optical module.

6. The laser lighting module according to claim 1, wherein the laser lighting module comprises an optical concentrator, wherein the optical concentrator is arranged to concentrate the safety detection light to the safety detector.

7. The laser lighting module according to claim 1, wherein the safety detector comprises an array of detector elements, and wherein the safety controller is arranged to receive a plurality of control signals from the detector elements.

8. The laser lighting module according to claim 1, wherein the safety detector comprises one detector element, and wherein the safety mirror or an optical concentrator are arranged to concentrate the safety detection light to the detector element.

9. The laser lighting module according to claim 1, wherein the safety controller is arranged to switch off the at least one laser if the control signal falls below a second threshold value.

10. The laser lighting module according to claim 1, wherein the safety mirror comprises an antireflective coating in the second wavelength range for reducing reflection of converted light to the safety detector.

11. The laser lighting module according to claim 1, wherein the safety mirror comprises a reflective coating which is reflective in the first wavelength range to provide the safety detection light.

12. The laser lighting module according to claim 11, wherein the reflective coating is arranged to reflect light in the first wavelength range received by the safety mirror within the scanning solid angle under a solid angle smaller than 10° with respect to an emission direction of laser light provided by the scanning arrangement and having been transmitted through the light conversion device without having been scattered.

13. The laser lighting module according to claim 1, wherein the safety mirror further comprises a reflective release structure, wherein the scanning arrangement is arranged to direct the laser beam of the laser light, at the beginning of laser emission or in predefined time periods, to the release structure, wherein the reflectivity of the release structure or the scanning arrangement are arranged that the safety detection light reflected by the release structure are detectable in the safety detector, wherein the safety detector is arranged to generate a release signal upon detection of the safety detection light reflected by the release structure, wherein the safety controller is arranged to receive the release signal from the safety detector, and wherein the safety controller is arranged to switch off the at least one laser if the release signal is not received at the beginning of laser emission or in the predefined time periods.

14. The laser lighting module according to claim 1, wherein the safety detector comprises an optical filter being transmissive in the first wavelength range and reducing transmission of light in the second wavelength range for reducing detection of converted light by the safety detector.

15. A vehicle headlight comprising:
a laser lighting module including
at least one laser;
a scanning arrangement;
a light conversion device;
a safety mirror;
a safety detector;
an electrical interface; and
a safety controller;
wherein the at least one laser is arranged to emit laser light characterized by a first wavelength range,
wherein the electrical interface is arranged to transfer electrical signals to the at least one laser,
wherein the scanning arrangement is arranged to move a laser beam of the laser light within a scanning solid angle such that a laser spot of the laser light is moved across a light entrance surface of the light conversion device,
wherein the light conversion device comprises a light converter,
wherein the light converter is arranged to convert a fraction of the laser light to converted light, wherein the converted light is characterized by a second wavelength range different than the first wavelength range,
wherein the light conversion device comprises a light emission surface arranged to emit a mixture of transmitted laser light and converted light,
wherein the safety mirror is arranged within the scanning solid angle such that at least 90% of the transmitted laser light emitted within the scanning solid angle hits the safety mirror,
wherein the safety mirror is arranged to provide safety detection light by reflecting a fraction of the transmitted laser light hitting the safety mirror to the safety detector, wherein the safety detector arranged to generate, irrespective of any polarization of the safety detection light, at least one control signal upon detection of the safety detection light, wherein the safety controller is arranged to receive the at least one control signal from the safety detector, and
wherein the safety controller is arranged to switch off the at least one laser if the at least one control signal exceeds a first threshold value.

\* \* \* \* \*